United States Patent
Behnke et al.

(10) Patent No.: US 6,252,397 B1
(45) Date of Patent: Jun. 26, 2001

(54) METAL DETECTING DEVICE FOR A CROP CONVEYOR

(75) Inventors: Willi Behnke, Steinhagen; Andreas Frosch, Gütersloh, both of (DE)

(73) Assignee: Claas Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 09/404,015

(22) Filed: Sep. 23, 1999

(30) Foreign Application Priority Data

Sep. 23, 1998 (DE) .............................. 198 43 608

(51) Int. Cl.⁷ .......................... A01D 75/18; G01R 33/12; G01R 33/02
(52) U.S. Cl. ...................... 324/232; 324/243; 56/10.2 J; 340/684
(58) Field of Search ............................. 324/207.15, 228, 324/232, 239–243, 262, 226; 56/10.2 J, DIG. 15; 340/684, 551

(56) References Cited

U.S. PATENT DOCUMENTS

| | | | |
|---|---|---|---|
| 3,972,156 | * 8/1976 | Bennett, Jr. et al. | ............ 324/243 X |
| 4,322,937 | 4/1982 | Hollmann | .............................. 56/10.2 |
| 4,344,074 | * 8/1982 | Strosser et al. | ....................... 340/684 |
| 4,433,528 | * 2/1984 | Bohman | ............................. 56/10.2 J |
| 5,343,676 | * 9/1994 | Weiss | .................................. 56/10.2 J |
| 5,414,353 | * 5/1995 | Weischedel | .......................... 324/232 |
| 5,426,844 | * 6/1995 | Suda et al. | .................. 324/207.15 X |
| 5,504,428 | * 4/1996 | Johnson | ................................ 324/243 |
| 5,901,534 | * 5/1999 | Weiss et al. | ....................... 56/10.2 J |

FOREIGN PATENT DOCUMENTS 43 01 611 A1   7/1994 (DE) .

* cited by examiner

Primary Examiner—Gerard R. Strecker
(74) Attorney, Agent, or Firm—Husch & Eppenberger, LLC; Robert E. Muir; Kevin M. Kercher

(57) ABSTRACT

A metal detecting device for a crop conveyor has several closely spaced permanent magnets fixed within a hollow feed-roller in parallel with the shaft thereof. One pole of each magnet is directed radially outwardly such that its magnetic field penetrates through the hollow feed-roller and an adjoining crop-feed slot from inside to out, and wherein said magnetic field also passes axially through a respective sensor winding that is likewise arranged within the hollow feed-roller.

24 Claims, 3 Drawing Sheets

METAL DETECTING DEVICE FOR A CROP CONVEYOR

BACKGROUND OF THE INVENTION

The present invention relates generally to agricultural machinery having crop conveyors, and more particularly to a metal detecting device for a crop conveyor. In a preferred embodiment, several closely spaced permanent magnets are fixed within a hollow feed-roller in parallel with the shaft thereof.

A metal detecting device of this type is known from DE 43 01 611 A1. A plurality of permanent magnets are arranged in a row, transversely of the crop feed path, within a hollow feed-roller. One magnetic pole of each magnet is directed toward the feed-roller and is located close to the inner surface thereof. The permanent magnets are surrounded by respective sensing coils and the other poles of the magnets are accommodated in a U-shaped yoke whose two ends terminate close to the inner face of the feed-roller. By this arrangement, the basic sensor field extends through the feed-roller into the adjacent feed-slot to a depth corresponding approximately to half the width of the yoke. The signals from the sensors are added to form the wanted signals and, to compensate for interference signals which arise, in particular, from the movement of the feed ribs of the feed-roller in each sensing field, they are subtracted from one another and then used as reference values. A disadvantage of this arrangement is the relatively small range covered by the sensing fields since there are limits to the amount by which the yoke can be enlarged. This is because the rotating members, which interfere heavily with the sensors, are located at the entry point of the feed-slot. Another disadvantage is that the detection process at the output of the feed-slot occurs too late to allow the conveyor to be stopped before a detected piece of metal reaches the subsequent chopper.

SUMMARY OF THE INVENTION

It is an object of the present invention to provide a metal detecting device for a crop conveyor which overcomes one or more of the deficiencies discussed above.

Another object is to improve the metal detecting device in such a way that the effective sensing field will extend deeper into the feed-slot and that the signal-to-noise ratio of the sensor signals will be increased.

In accordance with the invention there is provided a metal detecting device for use with a crop conveyor having a hollow feed roller mounted on a shaft, and an opposite roller spaced from the feed roller to provide a crop feed slot therebetween; the device including a plurality of magnets fixed within the hollow feed roller in parallel with the roller shaft, each magnet having a pole directed radially outwardly to an outer end within the roller, each magnet including a pole shoe arranged on the outer end and extending outwardly toward the roller such that a magnetic field of the magnet penetrates through the roller and the crop feed slot from inside to out, a sensor winding on the pole shoe and within the roller whereby said magnetic field also passes axially through the sensor winding.

A respective pole shoe is arranged on each of the radially outwardly directed poles of the permanent magnets so as to extend up close to the hollow feed-roller, and in that each said pole shoe penetrates the appertaining sensor winding and has a free pole face which is narrower than that of the corresponding permanent magnet so as to produce an enhanced field per unit area through the material of the pole shoe at the free pole face.

The fields of the permanent magnets are preferably oriented in parallel. The signal levels occurring under similar conditions when a standardized metallic body passes through the various regions of the slot covered by the individual sensors are higher at the center than in the lateral side regions so that it is advantageous to normalize the signal levels and to logically combine these normalized signals in order to compensate for interference.

These, and other objects and advantages of the present invention, will become apparent as the same becomes better understood from the following detailed description when taken in conjunction with the accompanying drawings.

BRIEF DESCRIPTION OF THE DRAWINGS

Reference is now made more particularly to the drawings which illustrate the best presently known mode of carrying out the invention and wherein similar reference characters indicate the same parts throughout the several views.

DETAILED DESCRIPTION

Figure 2:
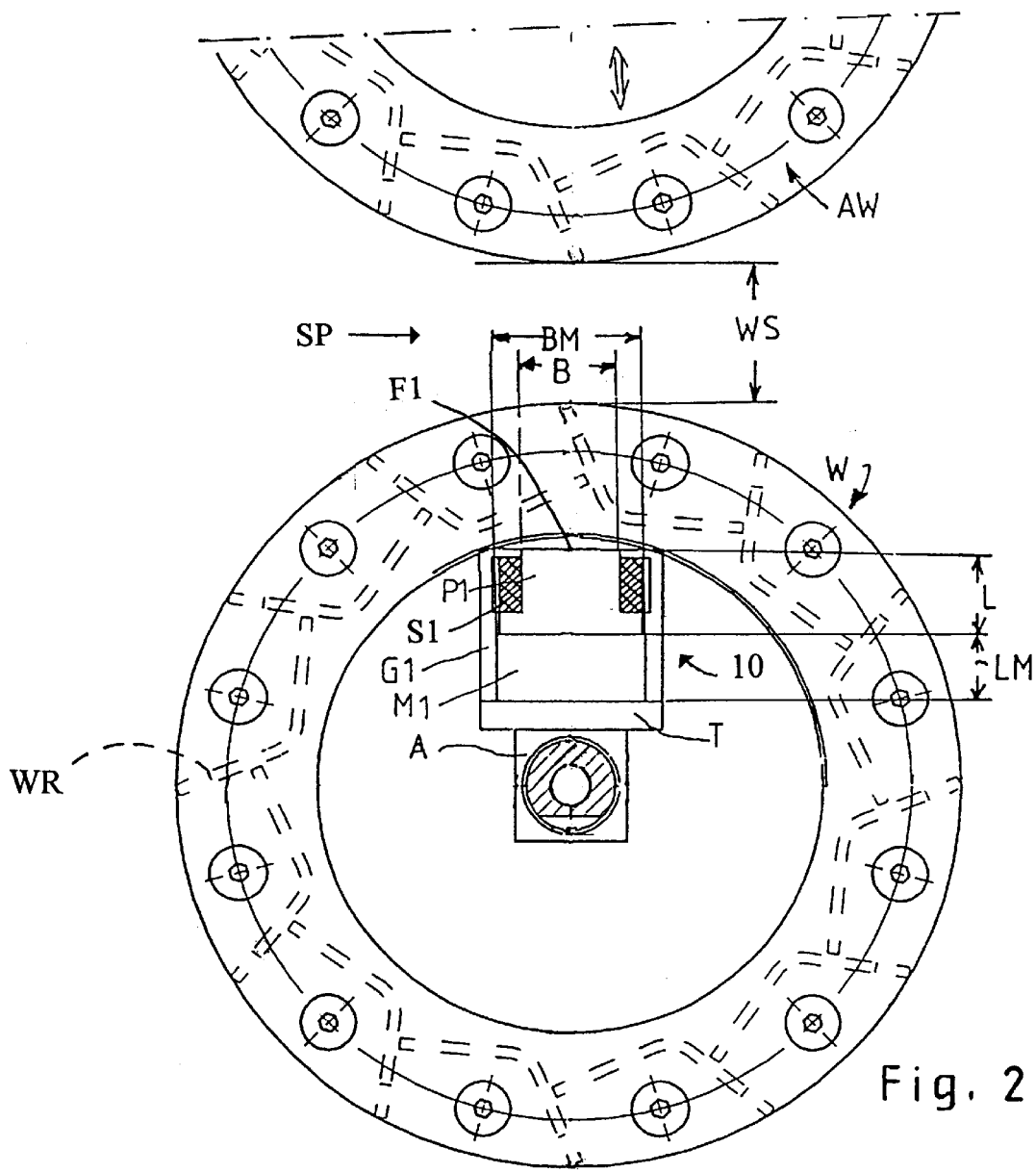
FIG. 2 is an end view of the feed roller and installed sensor device, and of an adjacent pressure roller.

As shown in FIG. 2, crop conveyor includes a hollow feed roller W and an adjacent pressure roller AW. The two rollers are spaced to provide a variable crop feed slot SP which has an average width WS.

Figure 1:
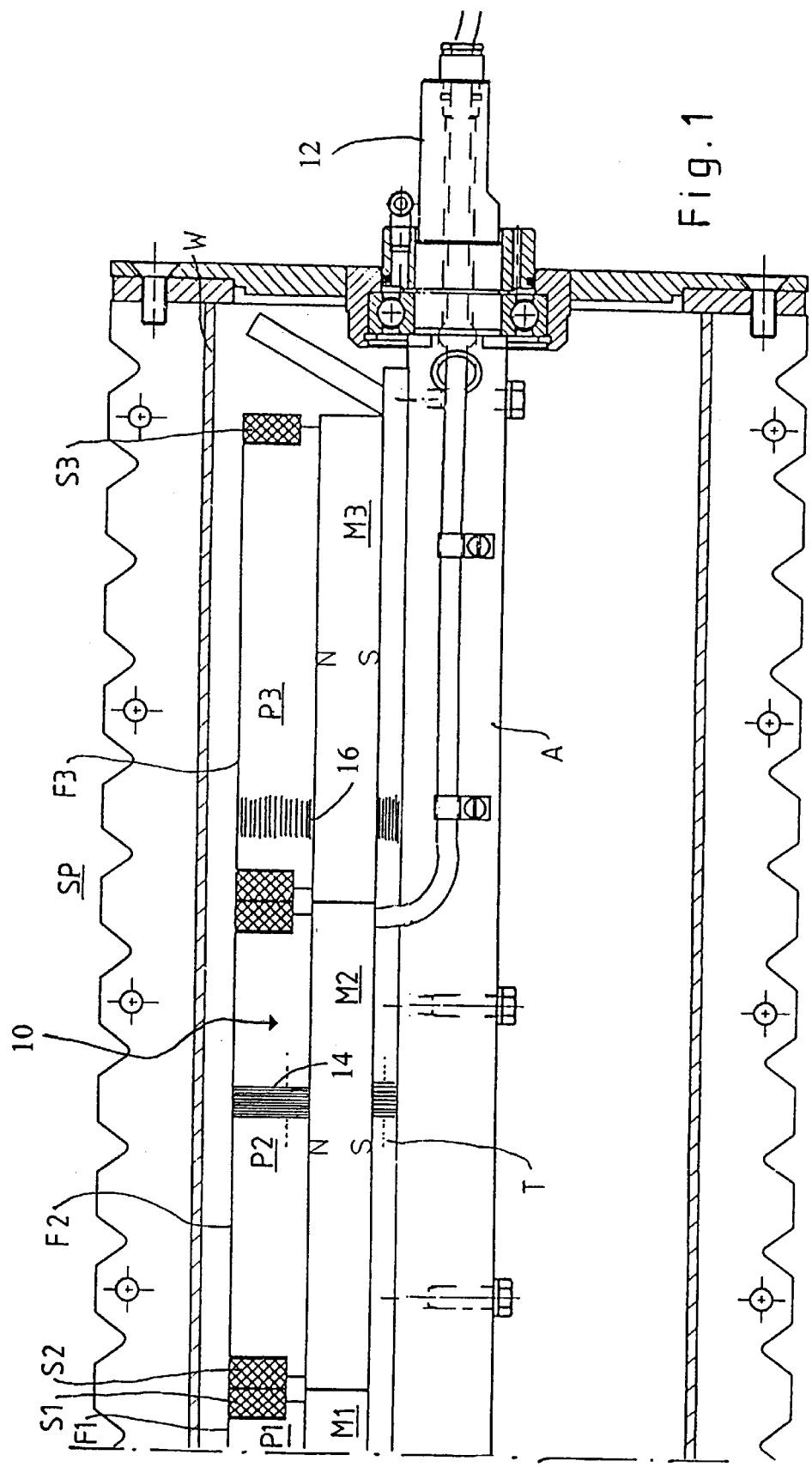
FIG. 1 is a longitudinal section through a feed roller and showing an installed sensor device in side view.

FIG. 1 shows the hollow feed roller W in longitudinal section and a side view along the longitudinal edge of a sensor device 10. The sensor device 10 includes three permanent magnets M1–M3 arranged side by side with their fields extending in parallel directions. The North and South poles of the magnets are indicated by "N" and "S" in FIG. 1. A respective pole shoe P1–P3 surrounded by a sensor winding S1–S3 is disposed on the north pole surfaces "N". A magnet (e.g. M1), a pole shoe (e.g. P1) and a sensor winding (e.g. S1) are advantageously coupled together form an individual replaceable module. These modules are mounted in a closely packed series on a plate-like support T of magnetically soft material which is fixed to a stationary shaft A of the hollow feed-roller W. The connections for the windings S1–S3 are fed out from one end 12 of the shaft A. It is very desirable for the pole shoes P1–P3 and the support T to have a construction to reduce eddy current losses in the wanted signal. For this purpose the pole shoes P1–P3 and the support T consist of a stack of mutually insulated transformer laminations which are either packed so as to extend in the radial direction as indicated by a short section 14 of the pole shoe P2, or, are layered in the axial direction as illustrated by a short section 16 of the pole shoe P3. Preferably the individual laminations are aligned radially or such that they are approximately radial.

FIG. 2 shows an end view of the sensor device 10. The flat support T which supports the respective modules (comprising, e.g., the magnet M1, the pole shoe P1 and the sensor winding S1) is mounted on the stationary shaft A. The modules are conveniently surrounded by a housing G1. The free face F1 of the pole shoe extends closely adjacent the hollow roller W. The width B of the free face F1 of the pole shoe is approximately ⅓ smaller than the width BM of the magnet thereby concentrating the field accordingly. Because the free face F1 of the pole shoe is narrower than the pole face of the magnet M1 and as a result of the elongation of the magnetic arrangement along the line of the field that is produced by this pole shoe, the field will penetrate deeper into the feed-slot SP. Moreover, the sector of the roller W located with the magnetic field at any one time is smaller than it would be without the narrow free face F1 of the pole shoe P1 so that the interference signals produced by the rotating metal ribs of the roller as they pass through the field are smaller relative to the wanted signal and, in addition, these signals are more alike in the various sensor devices so that they are easier to compensate. The duration of the interference signals produced by the ribs WR of the roller when passing through the field is thereby reduced.

The total length of the magnet and pole shoe arrangement preferably corresponds to the average width of the feed slot SP so that, when a normalized metallic foreign body is passing there through, it will produce an easily detectable signal even when the crop throughput is at its greatest and the width WS of the slot is at its largest and even if the foreign body is in its most extreme position. As shown in FIG. 2, a length L of the pole shoes P1–P3 corresponds approximately to the width of the magnets M1–M3. The total length comprising the length L of the pole shoe and a length LM of the magnet corresponds approximately to the average width WS of the variable feed slot SP formed between the feed-roller W and the co-operating spring-loaded pressure roller AW. As a result of this arrangement, a foreign metallic body of a defined minimum size will be penetrated by a sufficiently large component of the magnetic field even when it is passing close to the pressure roller, and consequently, the foreign metallic body will be detected.

Figure 3:
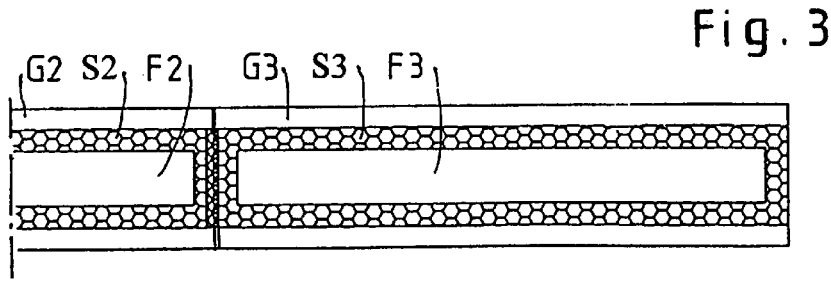
FIG. 3 is a top view of the sensor device.

FIG. 3 is a top view of a section of the arrangement including some of the three adjacently mounted modules, here, the free pole faces F2, F3 and the sensor windings S2–S3. The housings G2–G3 enclose the modules only along their longitudinal edges. The magnets and sensor windings S2–S3 are located very close together.

Figure 4:
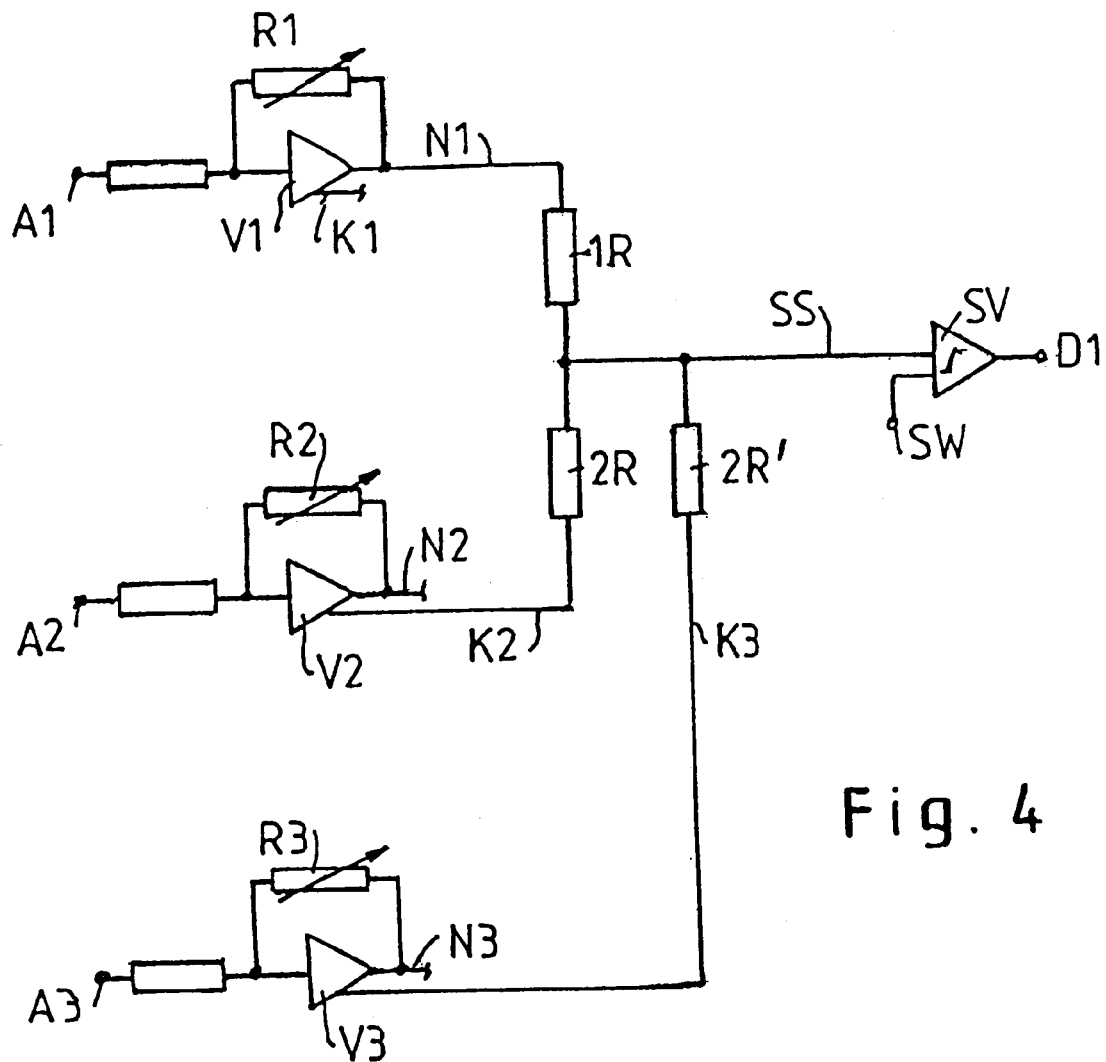
FIG. 4 is a schematic of a signal evaluating circuit.

FIG. 4 is a schematic of a circuit for evaluating output signals A1–A3 taken from the sensor windings S1–S3. These are normalized to a common output level in respective pre-amplifiers V1–V3 using appropriately adjusted feedback networks R1–R3. One of the level-normalized signals N1–N3 and the complementary signals K1–K3 of the other level-normalized signals are added in an adding network 1R, 2R, 2R' in such a way that the components of the interference signal are extensively compensated. The resulting sum signal SS is compared with a predefined threshold value SW in a threshold value comparator SV and a discriminator signal D1 is passed on for further processing whenever the threshold is exceeded. If, as shown, there are three sensors, the resistors 2R, 2R' of the adding network to which the complementary signals K1–K3 are applied have a resistance value which is twice that of the resistor 1R carrying the wanted signal N1. The same arrangement applies in respect of the other adders and comparators which are not illustrated in detail.

While a preferred embodiment of the invention has herein been illustrated and described, this has been done by way of illustration and not limitation, and the invention should not be limited except as required by the scope of the appended claims.

What is claimed is:

1. A metal detecting device for use with a crop conveyor having a hollow feed roller, longitudinally extending, mounted on a shaft, and an opposite roller, longitudinally extending, spaced from the feed roller to provide a crop feed slot therebetween; the device including a plurality of magnets fixed within the hollow feed roller in parallel with the roller shaft so that a length of the plurality of magnets, arranged in series, substantially corresponds to an average width of the crop feed slot each magnet having a pole directed radially outwardly within the roller, each magnet including a pole shoe arranged on the outer end and extending outwardly toward the roller such that a magnetic field of the magnet penetrates through the roller and the crop feed slot from inside to out, a sensor winding on the pole shoe and within the roller whereby said magnetic field also passes axially through the sensor winding.

2. A metal detecting device as in claim 1, wherein at least one of the magnets is a permanent magnet.

3. A metal detecting device as in claim 1, wherein the plurality of magnets are closely spaced.

4. A metal detecting device as in claim 1, wherein the pole shoe penetrates the appertaining sensor winding.

5. A metal detecting device as in claim 1, wherein the pole shoe has a free pole face at the outer end.

6. A metal detecting device as in claim 5, wherein the free pole face of is narrower than the corresponding magnet so as to produce an enhanced field per unit area through the pole shoe at that free pole face.

7. A metal detecting device as in claim 5, wherein the magnet has a width, and wherein the free pole face has a width being approximately one-third ($\frac{1}{3}$) less than the width of the magnet.

8. A metal detecting device as in claim 5, wherein the pole shoe has a length approximating the width of the magnet.

9. A metal detecting device as in claim 1, wherein each respective magnet, pole shoe, and sensor winding are combined to form a module.

10. A metal detecting device as in claim 9, including a magnetically soft, plate-like support for mounting a plurality of said modules.

11. A metal detecting device as in claim 1, wherein at least one pole shoe is in a form of layers of transformer laminations.

12. A metal detecting device as in claim 11, wherein the transformer laminations are mutually insulated.

13. A metal detecting device as in claim 12, wherein the mutually insulated transformer laminations are secured together.

14. A metal detecting device as in claim 12, wherein the mutually insulated transformer laminations are aligned substantially radially.

15. A metal detecting device as in claim 12, wherein the mutually insulated transformer laminations are aligned in parallel layers.

16. A metal detecting device as in claim 1, wherein at least one support is in a form of layers of transformer laminations.

17. A metal detecting device as in claim 16, wherein the transformer laminations are mutually insulated.

18. A metal detecting device as in claim 17, wherein the mutually insulated transformer laminations are secured together.

19. A metal detecting device as in claim 17, wherein the mutually insulated transformer laminations are aligned substantially radially.

20. A metal detecting device as in claim 17, wherein the mutually insulated transformer laminations are aligned in parallel layers.

21. A metal detecting device as in claim 1, wherein a plurality of magnets are magnetized such that their magnetic fields are aligned in parallel.

22. A metal detecting device as in claim 1, including means for generating output signals of a plurality of the sensor windings, and means for mutually normalizing the output signals with reference to a normalized throughflow of metal through a respectively appertaining crop feed slot region.

23. A metal detecting device as in claim 23, including means for compensating interference signals by adding output signals of a plurality of sensor windings.

24. A metal detecting device for a crop conveyor in which several closely spaced permanent magnets (M1–M3) are fixed within a hollow feed-roller (W), longitudinally extending, in parallel with the shaft (A) thereof, one pole (N) of each magnet being directed radially outwardly such that its magnetic field penetrates through the hollow feed-roller (W) and an adjoining crop-feed slot (SP) from inside to out, with a length of the several closely spaced permanent magnets (M1–M3), arranged in series, substantially corresponds to an average width of the crop-feed slot (SP), whereby said magnetic field also passes axially through a respective sensor winding (S1–S3) that is likewise arranged within the hollow feed-roller (W), wherein a respective pole shoe (P1–P3) is arranged on each of the radially outwardly directed poles of the permanent magnets (M1–M3) such as to extend close up to the hollow feed-roller (W), and wherein each said pole shoe penetrates the appertaining sensor winding (S1–S3) and has a free pole face (F1–F3) which is narrower than that of the corresponding permanent magnet (M1–M3) so as to produce an enhanced field per unit area through the material of the pole shoe at the free pole face.

* * * * *